(12) United States Patent
Ogura

(10) Patent No.: US 12,493,015 B2
(45) Date of Patent: Dec. 9, 2025

(54) ANALYSIS DEVICE FOR DATA OBTAINED IN MASS SPECTROMETRY, MASS SPECTROMETRY DEVICE, ANALYSIS METHOD FOR DATA OBTAINED IN MASS SPECTROMETRY AND NON-TRANSITORY COMPUTER READABLE MEDIUM STORING ANALYSIS PROGRAM

(71) Applicant: SHIMADZU CORPORATION, Kyoto (JP)

(72) Inventor: Tairo Ogura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 484 days.

(21) Appl. No.: 18/021,082

(22) PCT Filed: Aug. 24, 2020

(86) PCT No.: PCT/JP2020/031815
§ 371 (c)(1),
(2) Date: Jul. 7, 2023

(87) PCT Pub. No.: WO2022/044072
PCT Pub. Date: Mar. 3, 2022

(65) Prior Publication Data
US 2023/0384263 A1    Nov. 30, 2023

(51) Int. Cl.
*G01N 27/62*    (2021.01)
(52) U.S. Cl.
CPC .................................. *G01N 27/62* (2013.01)
(58) Field of Classification Search
CPC .................................................... G01N 27/62
See application file for complete search history.

(56) References Cited

U.S. PATENT DOCUMENTS

2009/0197345 A1*  8/2009  Seppala ............ C12Q 1/37
                                                    436/89
2016/0025741 A1    1/2016  Lock et al.

FOREIGN PATENT DOCUMENTS

JP    2020-20809 A    2/2020
WO    2013/033713 A1  3/2013

OTHER PUBLICATIONS

Notice of Reasons for Refusal issued Mar. 19, 2024 in Japanese Application No. 2022-544893.
Communication dated Oct. 10, 2023 issued by the Japanese Patent Office in application No. 2022-544893.
(Continued)

*Primary Examiner* — Sean M Luck
(74) *Attorney, Agent, or Firm* — Sughrue Mion, PLLC

(57) ABSTRACT

An analysis device for data obtained in mass spectrometry, includes an information acquirer that acquires detection information representing a peptide that is detected when a sample is subjected to a cleavage process and then subjected to mass spectrometry, and an information producer that produces allergen information in regard to an allergen included in the sample based on the detection information and data representing a peptide that is produced when each allergen is subjected to the cleavage process, wherein the information producer produces the allergen information based on a combination of a plurality of peptides in a case in which the plurality of peptides produced from one allergen in the data are detected.

12 Claims, 5 Drawing Sheets

(56) References Cited

OTHER PUBLICATIONS

Mascot Server 2.5 User's Manual, vol. 11, Matrix Science Corp., Dec. 2014, pp. 1-48 (91 pages).
Takahashi, T., et al., "Agriculture and Forestry 6! Identification and Reduction of Major Allergens in Wheat Wheat Whole-Grain", Journal of Japan Brewery Association, 2016, vol. 111, No. 8, pp. 507-515 (18 pages).
Communication issued Nov. 23, 2024 in Chinese Application No. 202080103489.9.
Mascot Server 2.5 Manual. Eleventh Edition. Matrix Science K.K., Dec. 2014, pp. 1-48, Internet: <URL:http://www.matrixscience.jp/pdf/jap_2.5_mserver_manual.pdf>, p. 3, third line from the bottom, 3-1. Types of Mascot Searches, 4-1. Scores and Expectation Values, 6. Connection with Mass Spectrograph System.
Takahashi, Kyoko et al., "Identificaion and Reduction of the Major Allergens in Whole Wheat Norin 61", Journal of the Brewing Society of Japan, 2016, pp. 507-515, vol. 111, No. 8.
International Search Report of PCT/JP2020/031815 dated Nov. 2, 2020 [PCT/ISA/210].
Written Opinion of PCT/JP2020/031815 dated Nov. 2, 2020 [PCT/ISA/237].

* cited by examiner

FIG. 3

TABLE A

| | WHEAT | BARLEY | RYE | ... |
|---|---|---|---|---|
| MRM1 | 40 | | | |
| MRM2 | 15 | 18 | 13 | |
| MRM3 | 42 | | | |
| MRM4 | | 22 | 23 | |
| MRM5 | | | | |
| MRM6 | 45 | | | |
| MRM7 | | 43 | | |
| MRM8 | | | 45 | |
| MRM9 | | 21 | 19 | |
| MRM10 | 14 | 16 | 16 | |
| MRM11 | | | 44 | |
| MRM12 | 24 | | 28 | |
| MRM13 | 45 | | | |
| MRM14 | | | 39 | |
| MRM15 | 45 | | | |
| MRM16 | 48 | | | |
| ⋮ | | | | |

F I G. 5
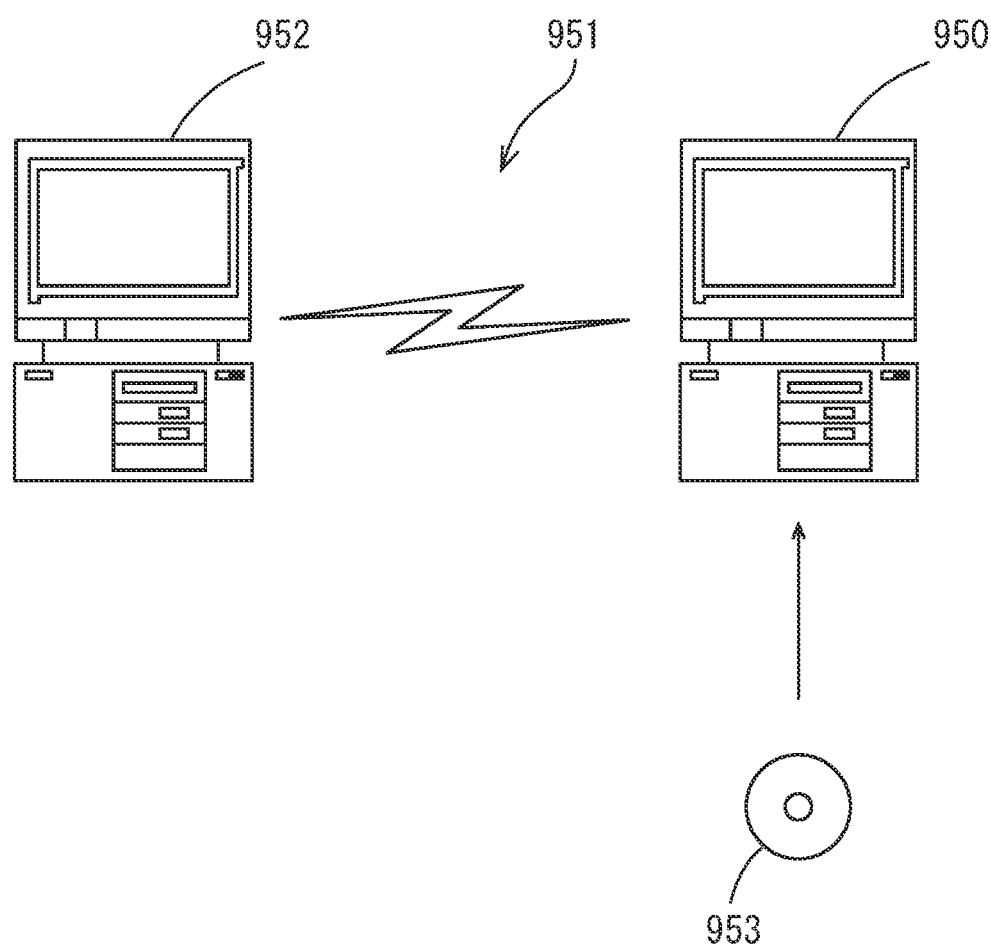

ANALYSIS DEVICE FOR DATA OBTAINED IN MASS SPECTROMETRY, MASS SPECTROMETRY DEVICE, ANALYSIS METHOD FOR DATA OBTAINED IN MASS SPECTROMETRY AND NON-TRANSITORY COMPUTER READABLE MEDIUM STORING ANALYSIS PROGRAM

CROSS REFERENCE TO RELATED APPLICATIONS

This application is a National Stage of International Application No. PCT/JP2020/031815 filed Aug. 24, 2020.

TECHNICAL FIELD

The present invention relates to an analysis device for data obtained in mass spectrometry, a mass spectrometry device, an analysis method for data obtained in mass spectrometry and a non-transitory computer readable medium storing an analysis program.

BACKGROUND ART

Detection of allergens from food and beverage products, environments or the like has been carried out for the purpose of preventing the onset of allergy, identifying substances that cause the onset of allergy, etc. In Patent Document 1, it is reported that an allergen included in a sample is detected when the allergen is decomposed by trypsin and a produced allergen-derived peptide is subjected to Liquid Chromatography/Mass Spectrometry (LC/MS).

CITATION LIST

Patent Document

[Patent Document 1] WO 2013/033713 A1

SUMMARY OF INVENTION

Technical Problem

It is desirable to accurately derive an allergen included in a sample from a detected allergen-derived peptide.

Solution to Problem

A first aspect of the present invention relates to an analysis device for data obtained in mass spectrometry that includes an information acquirer that acquires detection information representing a peptide that is detected when a sample is subjected to a cleavage process and then subjected to mass spectrometry, and an information producer that produces allergen information in regard to an allergen included in the sample based on the detection information and data representing a peptide that is produced when each allergen is subjected to the cleavage process, wherein the information producer produces the allergen information based on a combination of a plurality of peptides in a case in which the plurality of peptides produced from one allergen in the data are detected.

A second aspect of the present invention relates to a mass spectrometry device including the analysis device for data obtained in mass spectrometry of a first aspect.

A third aspect of the present invention relates to an analysis method for data obtained in mass spectrometry that includes acquiring detection information representing a peptide that is detected when a sample is subjected to a cleavage process and then subjected to mass spectrometry, and producing allergen information in regard to an allergen included in the sample based on the detection information and data representing a peptide that is produced when each allergen is subjected to the cleavage process, wherein the allergen information is produced based on a combination of a plurality of peptides in a case in which the plurality of peptides produced from one allergen in the data are detected.

A fourth aspect of the present invention relates to a non-transitory computer readable medium storing an analysis program for causing a computer to execute an information acquiring process of acquiring detection information representing a peptide that is detected when a sample is subjected to a cleavage process and then subjected to mass spectrometry, and an information producing process of producing allergen information in regard to an allergen included in the sample based on the detection information and data representing a peptide that is produced when each allergen is subjected to the cleavage process, wherein in the information producing process, the allergen information is produced based on a combination of a plurality of peptides in a case in which the plurality of peptides produced from one allergen in the data are detected.

Advantageous Effects of Invention

With the present invention, an allergen included in a sample can be derived accurately from a detected allergen-derived peptide.

BRIEF DESCRIPTION OF THE DRAWINGS

FIG. 3 is a table showing reference data.

FIG. 5 is a conceptual diagram showing a condition for providing a program.

DESCRIPTION OF EMBODIMENTS

Figure 1:
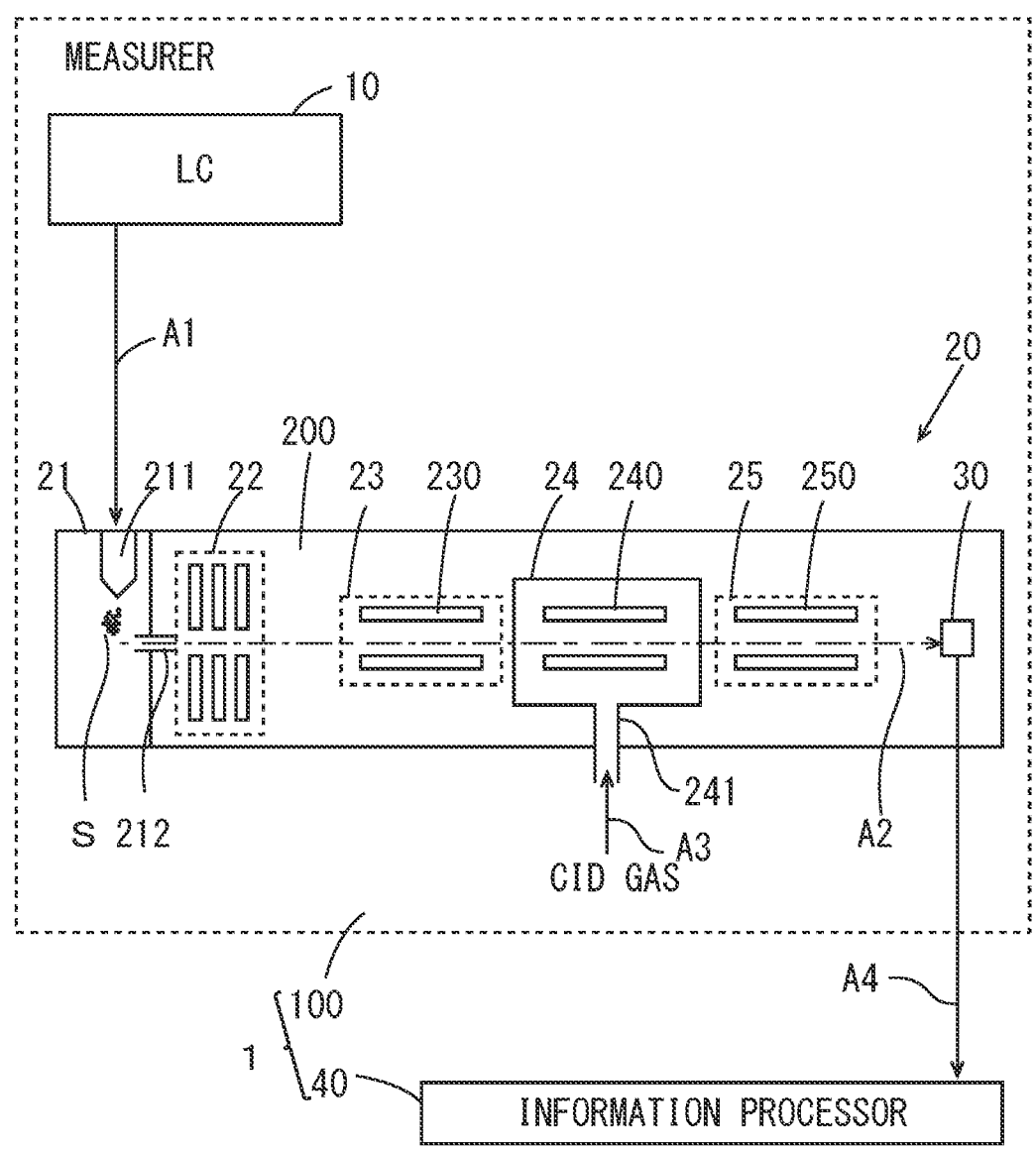
FIG. 1 is a conceptual diagram showing the configuration of a mass spectrometry device according to one embodiment.

Embodiments of the present invention will be described below with reference to the drawings.

Embodiments

In the present embodiment, a sample is subjected to a cleavage process and then subjected to mass spectrometry, and the information in regard to an allergen included in the sample is produced based on a peptide detected in the mass spectrometry. Hereinafter, the information is referred to as allergen information.

Hereinafter, a molecule causing allergy is referred to as an allergy-causing molecule, a substance such as a food or beverage product including an allergy-causing molecule is referred to as an allergy substance, and an allergy-causing molecule and an allergy substance are referred to as allergens. For example, milk which is an allergy substance includes casein and lactoglobulin as allergy-causing molecules. A chicken egg which is an allergy substance includes ovalbumin and lysozyme as allergy-causing molecules. Further, a peptide includes a peptide main chain made of a plurality of amino acids bonded by a peptide bond and may include a modifying group or the like in a case in which being detectable in mass spectrometry.

<Regarding Sample>

A sample is not limited in particular as long as the sample includes or may include an allergen. A sample can be a food or beverage product that is not known to include an allergen, for example. In this case, which allergen is included in a food or beverage product can be identified by a mass spectrometry method according to the present embodiment. When a food or beverage product ingested by a patient who has developed allergy, a vomit of the patient or the like is used as a sample, the information in regard to an allergen causing the allergy can be obtained and is useful for determination of a treatment plan or research. Alternatively, a sample may be a food or beverage product that is known to include an allergen, and the allergen included in the food or beverage product may be confirmed. In a case in which an allergy-causing molecule can be detected by mass spectrometry, a sample may include any substance such as pollen, house dust or mites in addition to a food or beverage product. In the following description, it is assumed that a subject allergen includes an allergy-causing molecule of protein.

(Preparation of Sample for Analysis)

A protein-degrading enzyme is added to a prepared sample, and an allergen is subjected to a cleavage process. A plurality of peptides derived from the allergen are produced when an allergy-causing molecule is cleaved by the enzyme. Although an enzyme to be used in the cleavage process is not limited in particular as long as it has specificity for the cleavage site in regard to cleavage of protein, trypsin or Lys-C is preferable. The cleavage site for cleavage with use of trypsin includes the cleavage site for cleavage with use of Lys-C. Therefore, it is possible to degrade an allergen more reliably due to the sequence specificity for cleavage with use of trypsin by adding both of trypsin and Lys-C to the sample. The allergy-causing molecule included in the sample may be cleaved not by enzymatic cleavage but by chemical cleavage. Hereinafter, a peptide produced by the cleavage process of an allergen is referred to as an allergen-derived peptide.

When the sample is subjected to the cleavage process, a sample for an analysis is prepared based on the sample including an allergen-derived peptide. The sample for an analysis can be prepared by pre-processing, corresponding to the type of an analysis to be performed on the sample, such as protein extraction.

(Regarding Mass Spectrometry Device)

FIG. 1 is a conceptual diagram showing the configuration of a mass spectrometry device 1 according to the present embodiment. The mass spectrometry device 1 includes a measurer 100 and an information processor 40. The measurer 100 includes a Liquid Chromatograph (LC) 10 and a mass spectrometer 20. The mass spectrometry device 1 is a Liquid Chromatograph-Mass Spectrometer (LC-MS) capable of performing LC/MS.

In a case in which the number of types of molecules included in a sample is not large, the mass spectrometry device 1 may be not an LC-MS but a mass spectrometer not including an LC, and may perform tandem mass spectrometry. In the following description, tandem mass spectrometry is mass spectrometry in which an analysis is performed in two or more stages.

The mass spectrometer 20 includes an ionizer 21 including an ion source 211, a vacuum container 200 and a tube 212 for introducing ions from the ionizer 21 into the vacuum container 200. The vacuum container 200 includes an ion guide portion 22, a first mass separator 23, a collision cell 24, a second mass separator 25 and a detector 30. The first mass separator 23 includes a first quadrupole 230. The collision cell 24 includes an ion guide 240 and a gas inlet port 241. The second mass separator 25 includes a second quadrupole 250.

A prepared sample for an analysis is introduced into the LC 10. The LC 10 separates each component included in the introduced sample for an analysis by liquid chromatography and elutes the component in different retention times. The type of LC 10 is not limited in particular as long as being capable of separating each allergen-derived peptide such that the allergen-derived peptide can be detected with desired accuracy in mass spectrometry. As the LC 10, a nano-LC, a micro-LC, a High Performance Liquid Chromatograph (HPLC), an Ultra High Performance Liquid Chromatograph (UHPLC) or the like can be used. The eluted sample including an allergen-derived peptide eluted from the LC 10 is introduced into the ionizer 21 of the mass spectrometer 20 (the arrow A1).

The mass spectrometer 20 performs tandem mass spectrometry on the eluted sample including an allergen-derived peptide introduced from the LC 10. In the present embodiment, the mass spectrometer 20 is a triple quadrupole mass spectrometer, and detects sample-derived ions S by performing Multiple Reaction Monitoring (MRM). The mass spectrometer 20 ionizes the eluted sample to produce sample-derived ions S, subjects the sample-derived ions S to mass separation, dissociates the mass-separated sample-derived ions S to produce product ions, and subjects the produced product ions to mass separation for detection. In the following description, it is assumed that product ions produced by dissociation of the sample-derived ions S are also included in the sample-derived ions S.

The ionizer 21 of the mass spectrometer 20 ionizes the eluted sample including an allergen-derived peptide that has been introduced into the ionizer 21. An ionization method is not limited in particular as long as ionization occurs to such an extent that product ions are detected with desired accuracy. However, an Electrospray Ionization (ESI) method is preferable, and it is assumed that ESI is performed in the below-mentioned embodiments. The ion source 211 is an ion source for ESI. The sample-derived ions S produced by the ionizer 21 move due to a difference between the pressure in the ionizer 21 and the pressure in the vacuum container 200, the effect of a voltage applied to an electrode (not shown) or the like and enter the ion guide portion 22 through a tube 212. In FIG. 1, the path of the sample-derived ions S is schematically indicated by the one-dot and dash arrow A2.

The ion guide portion 22 includes a quadrupole, a ring-shaped electrode or the like that is suitably arranged in a vacuum chamber (not shown) in which the pressure is lowered gradually. The pressure in the vacuum chamber in which the first mass separator 23 is arranged can be about $10^{-2}$ Pa. The ion guide portion 22 converges a flow of the sample-derived ions S using electromagnetic action and emits the sample-derived ions S to the first mass separator 23.

The first mass separator 23 selectively allows ions having a set m/z to pass through the first mass separator 23 as precursor ions by electromagnetic action based on a voltage applied to the first quadrupole 230 and emits the ions toward the collision cell 24. Although m/z is suitably used as a mass-to-charge ratio in the following description, it is not limited to m/z in particular as long as a value indicates the ratio between mass and charge number of ions. The first mass separator 23 selectively allows the precursor ions having an m/z corresponding to an ionized allergen-derived peptide to pass through.

The collision cell 24 dissociates the precursor ions by Collision-Induced Dissociation (CID) to produce product ions while controlling the movement of the sample-derived ions S using the ion guide 240 including a quadrupole. Gas (hereinafter referred to as a CID gas) including a molecule with which the precursor ions collide during CID is introduced from the gas inlet port 241 to have a predetermined pressure in the collision cell (the arrow A3). Although the type of a CID gas is not limited in particular as long as the CID gas is capable of allowing CID to occur efficiently as desired, an inert gas such as argon or nitrogen is preferable. Produced product ions are emitted toward the second mass separator 25.

A dissociation method is not limited to CID in particular, and dissociation can be carried out by any method such as electron capture dissociation or electron transfer dissociation.

The second mass separator 25 selectively allows the product ions having a set m/z to pass through the second mass separator 25 by electromagnetic action based on a voltage applied to the second quadrupole 250 and emits the product ions toward the detector 30.

The second mass separator 25 may be configured as a linear ion trap suitably including the second quadrupole 250.

The detector 30 includes an ion detector such as a secondary electron multiplier tube or a photomultiplier tube and detects the emitted product ions. A detection signal obtained by detection of the product ions is converted into a digital signal by an analog/digital (A/D) converter (not shown), is input to the information processor 40 as a digital signal and is stored in the storage 43 (the arrow A4). Hereinafter, the data based on a detection signal obtained by detection of the sample-derived ions S by the detector 30 is referred to as measurement data.

The information processor 40 includes an information processing apparatus such as an electronic calculator. The information processor 40 controls the measurer 100 and executes processes such as communication, storage, calculation, etc. in regard to various data in addition to suitably serving as an interface with respect to a user of the mass spectrometry device 1 (hereinafter simply referred to as a "user"). The information processor 40 is a device for analyzing data obtained by mass spectrometry performed by the mass spectrometer 20.

The information processor 40 may be configured as a single device integrated with the LC 10 or the mass spectrometer 20. Further, part of the data used in the present embodiment such as reference data may be stored in a remote server or the like.

Figure 2:
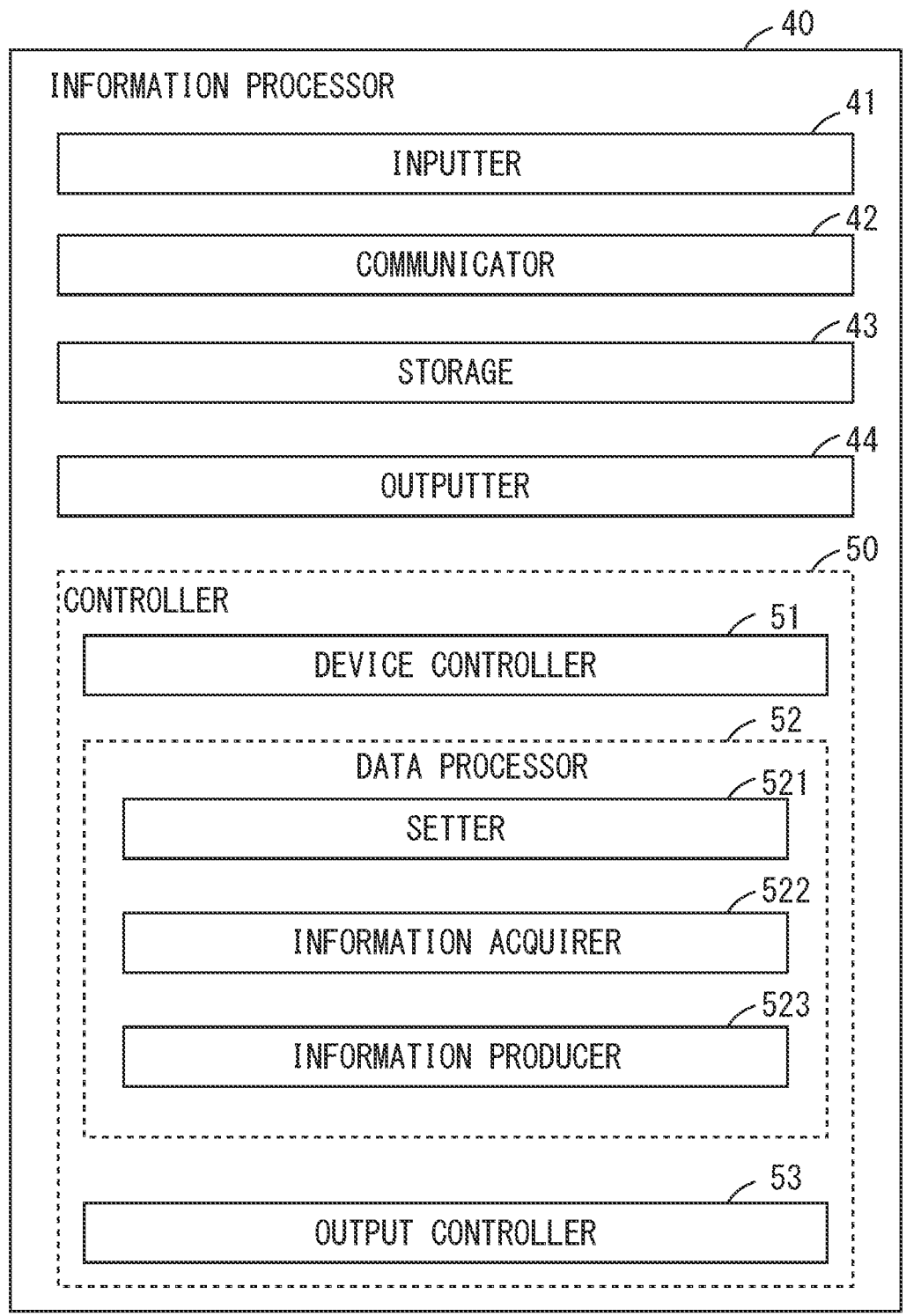
FIG. 2 is a conceptual diagram showing an information processor of the mass spectrometry device.

FIG. 2 is a conceptual diagram showing the configuration of the information processor 40. The information processor 40 includes an inputter 41, a communicator 42, a storage 43, an outputter 44 and a controller 50. The controller 50 includes a device controller 51, a data processor 52 and an output controller 53. The data processor 52 includes a setter 521, an information acquirer 522 and an information producer 523.

The inputter 41 of the information processor 40 is configured to include an input device such as a mouse, a keyboard, various buttons or a touch panel. The inputter 41 receives information required for controlling an operation of the measurer 100, information required for a process to be executed by the controller 50 and so on from the user.

The communicator 42 of the information processor 40 is configured to include a communication device that can communicate via wireless or wired connection through a network such as the Internet. The communicator 42 suitably transmits and receives necessary data.

The storage 43 of the information processor 40 includes a non-volatile storage medium. The storage 43 stores an analysis condition, measurement data, a program for the controller 50 to execute a process and the like. Reference data is stored in the storage 43.

FIG. 3 is a diagram showing the table A schematically representing the reference data. In the reference data, numerical values associated with allergen-derived peptides and allergens are shown. In the table A, the correspondence is represented by the numerical values input for the elements indicated by the column corresponding to each allergen item P1 and the row corresponding to each peptide item P2. The numerical values are referred to as scores. The scores are used for calculation for deriving whether each allergen is included in a sample from a detected allergen-derived peptide. In the example of the table A, the scores are set such that, when an allergen-derived peptide is detected, the higher a score, the higher the probability that an allergen derived from the detected allergen-derived peptide is included in a sample.

The allergen item P1 in the table A is the item indicating allergens, and the names of respective allergens such as "wheat," "barley" and "rye" are shown in the allergen item P1. The peptide item P2 is the item indicating allergen-derived peptides, and the labels corresponding to respective allergen-derived peptide such as "MRM1," "MRM2" and "MRM3" are shown in the peptide item P2. In the score item P3, scores are indicated with numerical values.

The reference data is the data representing an allergen-derived peptide produced when each allergen is subjected to the cleavage process. The reference data is prepared for each type of the cleavage process such as a process with use of trypsin or Lys-C. In the example of the table A, the scores take values from 0 to 50. The blank space represents a score of 0 and corresponds to no production of an allergen-derived peptide by the cleavage process of allergen. In this case, detection of the allergen-derived peptide is unrelated to the presence or absence of an allergen in a sample. A score exceeding than 0 corresponds to production of an allergen-derived peptide by the cleavage process of allergen. In other words, a score exceeding 0 corresponds to the allergen-derived peptide being derived from the allergen. In this case, when the allergen-derived peptide is detected in the mass spectrometry of a sample for an analysis, the sample may include the allergen.

For example, the table A represents the reference data in a case in which the cleavage process is executed with use of trypsin. Further, it is assumed that an allergen-derived peptide corresponding to MRM4 in the table A is detected by mass spectrometry of a sample subjected to a trypsin process. In this case, since the allergen-derived peptide corresponding to MRM4 is produced by the trypsin process for barley or rye, the sample may include barley or rye. On the other hand, detection of the allergen-derived peptide corresponding to MRM4 does not affect the possibility that the sample includes wheat. This is because, since the allergen-derived peptide corresponding to MRM4 is not produced in the trypsin process for wheat, presence or absence of wheat in the sample does not affect the detection of the allergen-derived peptide corresponding to MRM4.

The score in the reference data can be suitably set based on the number of allergens from which an allergen-derived peptide is derived in the reference data, or the like. For example, the allergen-derived peptide corresponding to MRM2 is not derived from an allergen other than wheat, barley or rye. In a case in which the allergen-derived peptide corresponding to MRM2 is detected, it can be confirmed that at least one of wheat, barley and rye is included in a sample. However, even in a case in which the allergen-derived peptide corresponding to MRM2 is detected, all of the detected allergen-derived peptides may be derived from barley or rye, and it cannot be confirmed that the sample includes wheat. Similarly, it cannot be confirmed either that barley or rye is included in the sample.

On the other hand, it is assumed that the allergen-derived peptide corresponding to MRM3 is not derived from an allergen other than wheat. Since the allergen-derived peptide corresponding to MRM3 is specifically produced from wheat by the cleavage process, when the allergen-derived peptide corresponding to MRM3 is detected, it can be estimated that wheat is included in a sample with probability higher than that of a case in which MRM2 is detected. A score for an allergen-derived peptide derived from one type of allergen in the reference data is referred to as a first score. A score for an allergen-derived peptide derived from a plurality of types of allergens in the reference data is referred to as a second score. At this time, the first score can be set to have a higher contribution to the possibility, that an allergen is included in a sample in a case in which the allergen-derived peptide is detected, than the second score.

The score of the reference data can also be set based on how easily an allergen-derived peptide is produced from each allergen in the cleavage process. For example, it is assumed that, even in a case in which a certain allergen-derived peptide can be produced from barley or rye according to its amino acid sequence, it is very unlikely that the allergen-derived peptide is produced from barley in the cleavage process. In this case, the score can be set such that, when the allergen-derived peptide is detected, the probability that rye is included in a sample is higher than the probability that barley is included in the sample.

A numerical value set as a score is not limited in particular and can be suitably set based on the algorithm for producing allergen information, described below. For example, the numerical range of the score can be arbitrarily set to the range from 0 to 1, the range from 0 to 100, or the like. Further, the format and the like of the reference data are not limited in particular as long as the value in regard to each allergen can be referenced from the information representing a detected allergen-derived peptide. The reference data can be stored in a format such as a two-dimensional array corresponding to FIG. 3, for example. In the peptide item P2, the names or identification numbers of transitions, described below, for mass-separation of an allergen-derived peptide may be indicated. This is because an allergen-derived peptide can be specified by a transition since the allergen-derived peptide and the transition correspond to each other.

An allergen included in the reference data in the present embodiment may be an allergy substance or an allergy-causing molecule. As allergy substances, milk, chicken eggs, wheat, barley, rye, oats, mustard, sesame seeds, macadamia nuts, pistachio nuts, brazil nuts, walnuts, peanuts and hazelnuts can be included in the reference data. As allergy-causing molecules included in them, ovalbumin, lysozyme, casein, lactoglobulin, a high molecular weight glutenin, a low molecular weight glutenin, wheat protein, rye protein, oat protein, barley protein, mustard protein, sesame protein, macadamia nut protein, pistachio nut protein, brazil nut protein, walnut protein, peanut protein and hazelnut protein can be included in the reference data. These allergy-causing molecules can be measured by the transition described in Patent Document 1. In addition, various allergens such as buckwheat, shrimp or crab can be included in the reference data according to a transition for detecting a peptide produced by a specific cleavage process, or the like.

Returning to FIG. 2, the outputter 44 of the information processor 40 is constituted by a display device such as a liquid crystal monitor or a printer and displays information relating to the measurement by the measurer 100, information obtained by a process executed by the data processor 52, etc. on the display device or prints the information on paper media.

The controller 50 of the information processor 40 is constituted by a processor such as a Central Processing Unit (CPU) and a storage medium such as a memory and functions as a main constituent for an operation of controlling the mass spectrometry device 1. The controller 50 is a processing device that executes a process of producing information (allergen information) in regard to an allergen included in a sample. The controller 50 keeps a program stored in the storage 43 or the like in the memory and executes various processes when the program is executed by the processor.

As long as the controller 50 according to the present embodiment can execute a process, the physical configuration or the like of the controller 50 is not limited in particular.

The device controller 51 of the controller 50 controls the operation of each component of the measurer 100 so as to satisfy an analysis condition set by user input or the like. The device controller 51 sets an allergen-derived peptide to be detected. The device controller 51 may perform setting such that mass spectrometry is performed on all of the allergen-derived peptides represented by the reference data, or may perform setting such that mass spectrometry is performed on part of the allergen-derived peptides according to the selection made by the user or the like. In a case in which a screening test for an allergen included in a sample is performed, it is preferable to comprehensively detect each allergen-derived peptide included in the reference data.

The device controller 51 may set an allergen-derived peptide to be detected based on the information stored in advance in the storage 43 or the like. For example, the storage 43 stores a plurality of sets of allergen-derived peptides to be detected based on differences in allergen among countries or regions, differences in reactivity among humans or the like who ingest allergens or come into contact with allergens among countries or regions, or differences in regulation among countries or regions. The device controller 51 can set an allergen-derived peptide included in a set selected by user input or an allergen-derived peptide included in a set corresponding to the country, region or the like registered by the user as an allergen-derived peptide to be detected.

The device controller 51 acquires a transition, for detecting an allergen-derived peptide, which is associated with the allergen-derived peptide represented by the reference data. A transition refers to a set of an m/z of precursor ions and an m/z of product ions when specific ions are detected by tandem mass spectrometry. A transition is preferably stored in advance in the storage 43 or the like in association with the allergen item P1 in the reference data. The device controller 51 controls the first mass separator 23 and the second mass separator 25 so as to allow ions having an m/z included in each transition to pass through the first mass separator 23 and the second mass separator 25.

The data processor 52 of the controller 50 performs a process of analyzing the measurement data obtained in mass spectrometry.

The setter 521 of the data processor 52 sets an allergen the allergen information of which is to be produced. The allergen information can be the information in regard to an allergen included in a sample and the information in regard to whether each allergen is included in a sample. An allergen the allergen information of which is to be produced is an allergen to be detected. For example, the allergen information can include the information representing whether each allergen is included in a sample with a binary value, a character, a sentence or the like, or the information representing the possibility that each allergen is included in a sample with a numerical value, a character, a sentence or the like. Hereinafter, an allergen the allergen information of which is to be produced is referred to as a subject allergen.

The setter 521 may set all of the allergens represented by the reference data as subject allergens, or may set part of the allergens as a subject allergen according to the selection made by a user, or the like. For example, in a case in which a screening test of an allergen included in a sample is performed, it is preferable to comprehensively set each allergen included in the reference data as a subject allergen.

The setter 521 may set a subject allergen based on the information stored in the storage 43 or the like in advance. For example, in the storage 43, a plurality of sets of subject allergens are stored in accordance with the differences among countries or regions as described above. The setter 521 can set an allergen included in a set selected by user input or an allergen included in a set corresponding to a country, a region or the like registered by the user, as a subject allergen.

The information acquirer 522 of the data processor 52 acquires detection information. The detection information is the information representing an allergen-derived peptide detected when a sample is subjected to the above-mentioned cleavage process and then subjected to mass spectrometry. A method of representing detection information is not limited in particular as long as a detected allergen-derived peptide is indicated. For example, a detected allergen-derived peptide can be indicated by an identification number or the like associated with an allergen-derived peptide of the reference data.

The information acquirer 522 acquires a detection intensity, which is a value representing the magnitude of a detection signal of each allergen-derived peptide from the measurement data. The detection intensity can be an integrated value of the intensities of detection signals during mass separation by a transition of each allergen-derived peptide. The information acquirer 522 determines whether each allergen-derived peptide is detected based on whether the detection intensity of each allergen-derived peptide satisfies a condition based on a predetermined threshold value. The threshold value is referred to as a first threshold value. The first threshold value may be set based on the magnitude of noise or like, or may be a value stored in the storage 43 in advance, for example. For example, in a case in which the detection intensity of an allergen-derived peptide is equal to or higher than the first threshold value, the information acquirer 522 determines that the allergen-derived peptide has been detected by mass spectrometry.

The information acquirer 522 determines whether the allergen-derived peptide has been detected in regard to all of allergen-derived peptides subjected to mass spectrometry. The information acquirer 522 produces the detection information representing a detected allergen-derived peptide.

The information processor 40 may be configured as a data processing device that is not included in the mass spectrometer 1. In this case, the information acquirer 522 may analyze the measurement data acquired via the communicator 42 or the like to produce and acquire the detection information, or may acquire the detection information via the communicator 42 or the like.

The information producer 523 of the data processor 52 produces allergen information based on the detection information and the reference data. In regard to a subject allergen, the information producer 523 calculates the sum of the scores of a plurality of detected allergen-derived peptides that are derived from the subject allergen. The sum is referred to as a total score. The information producer 523 determines whether each subject allergen is included in a sample based on whether the total score satisfies a condition based on a predetermined threshold value. The predetermined threshold value is referred to as a second threshold value. The second threshold value is suitably set based on the score of the reference data and is stored in the storage 43 or the like in advance.

In a case in which one allergen-derived peptide is detected in regard to a subject allergen, the score of the allergen-derived peptide may be used as a total score.

For example, in a case in which the total score of a subject allergen is equal to or larger than the second threshold value, the information acquirer 522 determines that the subject allergen is included in a sample. In a more specific example, it is assumed that allergen-derived peptides corresponding to MRM2, MRM10 and MRM12 in the reference data of FIG. 3 are measured by mass spectrometry, and these three allergen-derived peptides are detected. The second threshold value is set to 50. When the subject allergen is wheat, the total score for wheat is 15+14+24=53, which is a value equal to or larger than the second threshold value. In this case, the information acquirer 522 determines that wheat is included in a sample. In another example, it is assumed that allergen-derived peptides corresponding to MRM1 and MRM12 are measured by mass spectrometry, and these two allergen-derived peptides are detected. The second threshold value is set to 50. When a subject allergen is wheat, the total score for wheat is 40+15=55, which is equal to or larger than the second threshold value. In this case, the information acquirer 522 determines that wheat is included in a sample.

The score may be indicated by a symbol such as A, B or C instead of a numerical value. In this case, a condition such as that there are two or more than two As or that there is one A and two or more than two Bs can be used instead of the second threshold value. In the following description, a "value" includes characters such as a numerical value and a symbol indicating a score.

In these examples, determination is made also with use of the information obtained by detection of allergen-derived peptides of MRM2, MRM10 and MRM12, which are not peptides specifically detected in wheat. In this manner, with the analysis method of the present embodiment, detection of allergen-derived peptides derived from a plurality of allergens can be reflected in determination of whether a subject allergen is included in a sample, and an allergen included in a sample can be analyzed more accurately. Further, in a case in which a plurality of allergen-derived peptides produced from one allergen in the reference data are detected, the information producer 523 produces allergen information based on a combination of the plurality of detected allergen-derived peptides. This is achieved by the configuration in which whether a subject allergen is included in a sample is determined by integration of information obtained by detection of a plurality of allergen-derived peptides with use of a plurality of scores in regard to a plurality of allergen-derived peptides and a subject allergen.

The information producer 523 calculates a total score in regard to each set subject allergen and compares the total score with the second threshold value to determine whether each subject allergen is included in a sample. The information producer 523 produces the allergen information representing an allergen determined to be included in a sample.

The form for allergen information is not limited in particular as long as it represents information in regard to whether each allergen is included in a sample. In the allergen information, whether each subject allergen is included in a sample can be indicated by a binary value, for example. In the allergen information, a subject allergen included in a sample may be indicated by an identification number. Alternatively, in the allergen information, a subject allergen included in a sample may be indicated by a sentence or a diagram. In the allergen information, the possibility or the probability that a subject allergen is included in a sample may be represented. For example, in the allergen information, a plurality of subject allergens can be represented in a list or the like in a descending order of the possibility of being included in a sample based on a total score, or the possibility of being included in a sample can be represented by a total score, or a numerical value or a symbol based on the total score. The numerical value or symbol can be arbitrarily set to indicate high, medium, low or the like based on the degree of the above-mentioned possibility to facilitate understanding for the user.

The output controller 53 controls the outputter 44 to output an analysis condition or information obtained by an analysis performed by the data processor 52 by displaying it on the display device. The output controller 53 presents the allergen information to the user by outputting an image representing the allergen information.

Figure 4:
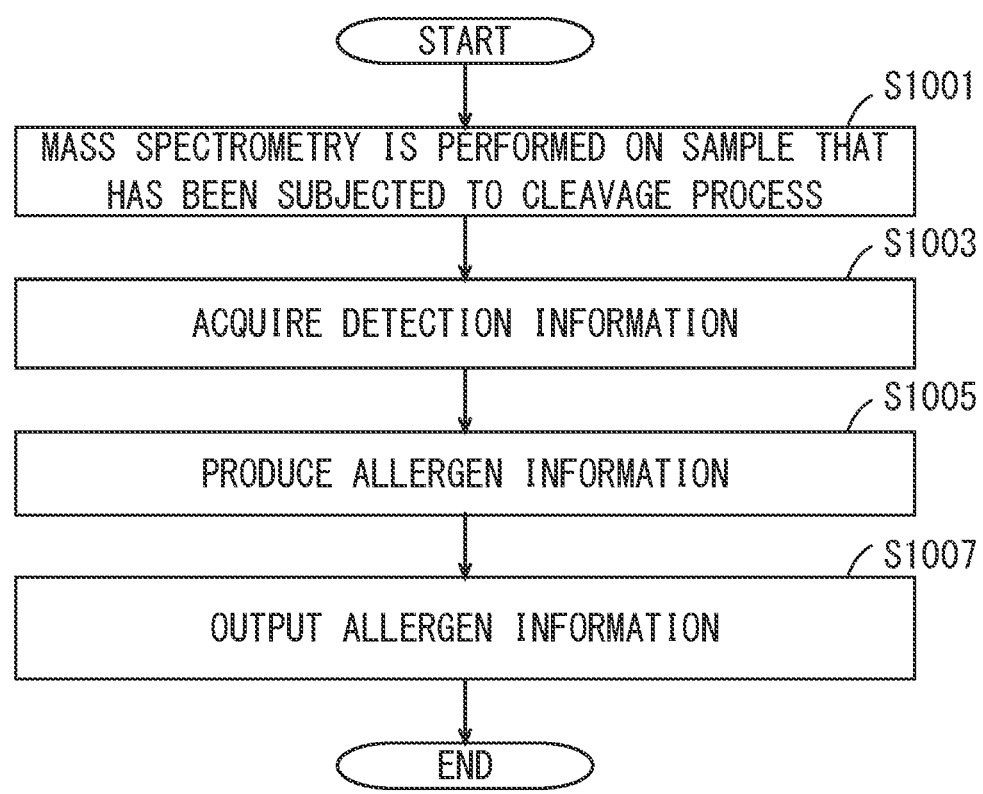
FIG. 4 is a flowchart showing a flow of a method of analyzing data obtained in mass spectrometry according to the one embodiment.

FIG. 4 is a flowchart showing a flow of a mass spectrometry method including a method of analyzing data obtained in mass spectrometry according to the present embodiment. Each step in FIG. 4 is preferably executed by the controller 50 of the mass spectrometry device 1. In the step S1001, the device controller 51 performs mass spectrometry on a sample that has been subjected to the cleavage process. When the step S1001 ends, the step S1003 is started.

In the step S1003, the information acquirer 522 produces to acquire detection information. When the step S1003 ends, the step S1005 is started. In the step S1005, the information producer 523 produces allergen information. When the step S1005 ends, the step S1007 is started. In the step S1007, the output controller 53 controls the outputter 44 to output the allergen information. When the step S1007 ends, the process ends.

Following modifications are in the scope of the present invention and can be combined with the above-mentioned embodiment. In the below-mentioned modified example, parts having structure and functions similar to those of the above-mentioned embodiment are denoted with the same reference numerals, and a description will suitably be not repeated.

Modified Example 1

In the above-mentioned embodiment, whether a subject allergen is included in a sample is determined with use of the sum of the scores of detected allergen-derived peptides. However, the information producer 523 may produce allergen information of a subject allergen with use of a weighted sum of the scores of detected allergen-derived peptides. The information producer 523 can determine whether a subject allergen is included in a sample based on whether a weighted sum is equal to or larger than the second threshold value. In a case in which a weighted sum is used, the detection intensity of a detected allergen-derived peptide is preferably used as a weight. Since it is considered that the higher the detection intensity of an allergen-derived peptide, the more reliable the detection, it is possible to derive an allergen included in a sample more accurately by increasing the weight of an allergen-derived peptide having a high detection intensity.

Modified Example 2

A program for implementing an information processing function of the mass spectrometry device 1 may be recorded in a computer-readable recording medium. A computer system may read the program, which is recorded in the recording medium, in regard to the control of a process to be executed by the above-mentioned data processor 52 and its related processes and execute the program. A "computer system" here includes hardware such as an OS (Operating System) or peripheral appliances. Further, a "computer-readable recording medium" refers to a movable recording medium such as a flexible disc, an optical magnetic disc, an optical disc or a memory card and a storage device such as a hard disc or a Solid State Drive (SSD) built into the computer system. Further, a "computer-readable recording medium" may include an object that retains a program movably for a short period of time such as a communication wire that is used when a program is transmitted through a network such as the Internet or a communication line such as a telephone line, or an object that retains a program for a certain period of time such as a volatile memory in a computer system that serves as a server or a client. Further, the above-mentioned program may be to implement part of the above-mentioned functions and may further be to implement the above-mentioned functions by being combined with a program that has already been recorded in the computer system.

Further, in a case in which being applied to a personal computer (hereinafter referred to as a PC), the program relating to the above-mentioned control can be provided via a recording medium such as a CD-ROM, or a data signal such as the Internet. FIG. 5 is a diagram showing the above-mentioned provision. A PC 950 receives a program via a CD-ROM 953. Further, the PC 950 has a function of being connected to a communication line 951. The computer 952 is a server computer that provides the above-mentioned program and stores the program in a recording medium such as a hard disc. The communication line 951 is a communication line such as the Internet or a personal computer communication, or a dedicated communication line. The computer 952 reads a program with the use of a hard disc and transmits the program to the PC 950 through the communication line 951. That is, the program is transported by a carrier wave as a data signal and transmitted through the communication line 951. In this manner, the program can be provided as a computer-readable computer program product in various forms such as a recording medium or a carrier wave.

Aspects

It is understood by those skilled in the art that the plurality of above-mentioned illustrative embodiments or modifications are specific examples of the below-mentioned aspects.

(Item 1) An analysis device for data obtained in mass spectrometry according to one aspect includes an information acquirer that acquires detection information representing a peptide that is detected when a sample is subjected to a cleavage process and then subjected to mass spectrometry, and an information producer that produces allergen information in regard to an allergen included in the sample based on the detection information and data (reference data) representing a peptide that is produced when each allergen is subjected to the cleavage process, wherein the information producer produces the allergen information based on a combination of a plurality of peptides in a case in which the plurality of peptides produced from one allergen in the data are detected. Thus, the allergen included in the sample can be accurately derived from the detected allergen-derived peptide.

(Item 2) The analysis device for data obtained in mass spectrometry according to another aspect, wherein the data includes a value associated with a peptide and an allergen, and the information producer produces the allergen information based on a plurality of the values in regard to the plurality of peptides and the one allergen in a case in which the plurality of peptides produced from the one allergen in the data are detected, in the analysis device for data obtained in mass spectrometry according to an aspect of item 1. Thus, it is possible to derive the allergen included in the sample more accurately by suitably setting the value.

(Item 3) The analysis device for data obtained in mass spectrometry according to another aspect, wherein the value is set based on a count of allergens derived from a peptide in the data, in the analysis device for data obtained in mass spectrometry according to an aspect of item 2. Thus, information in regard to an allergen-derived peptide derived from a plurality of allergens can be reflected, and the allergen included in the sample can be derived more accurately.

(Item 4) The analysis device for data obtained in mass spectrometry according to another aspect, wherein the value is a numerical value, and the information producer produces the allergen information based on whether a calculated value that is calculated based on a plurality of the values satisfy a condition based on a threshold value in a case in which the plurality of peptides produced from the one allergen in the data are detected, in the analysis device for data obtained in mass spectrometry of an aspect according to item 2 or 3. Thus, it is possible to derive the allergen included in the sample more accurately by suitably setting the numerical value and the threshold value.

(Item 5) The analysis device for data obtained in mass spectrometry according to another aspect, wherein the calculated value is a sum or a weighted sum of a plurality of the numerical values, in the analysis device for data obtained in mass spectrometry according to an aspect of item 4. Thus, the information in regard to detection of a plurality of allergen-derived peptides derived from one subject allergen can be integrated, and the allergen included in the sample can be derived more accurately.

(Item 6) The analysis device for data obtained in mass spectrometry according to another aspect, wherein the calculated value is the weighted sum, and a weight of the weighted sum is a detection intensity of the plurality of peptides respectively corresponding to the plurality of numerical values, in the analysis device for data obtained in mass spectrometry according to an aspect of item 5. Thus, the allergen included in the sample can be derived more accurately based on the detection intensity.

(Item 7) The analysis device for data obtained in mass spectrometry according to another aspect, wherein an allergen included in the data is at least one allergen selected from milk, chicken eggs, wheat, barley, rye, oats, mustard, sesame seeds, macadamia nuts, pistachio nuts, brazil nuts, walnuts, peanuts, hazelnuts, buckwheat, shrimp, crab, ovalbumin, lysozyme, casein, lactoglobulin, a high molecular weight glutenin and a low molecular weight glutenin, in the analysis device for data obtained in mass spectrometry according to any one of items 1 to 6. Thus, these allergens included in the sample can be accurately derived.

(Item 8) The analysis device for data obtained in mass spectrometry according to another aspect, wherein the data represents a peptide that is produced when each allergen is subjected to a cleavage process with use of at least one of trypsin and Lys-C, in the analysis device for data obtained in mass spectrometry according to any one of items 1 to 7. Thus, the allergen included in the sample can be derived more accurately with reference to a result of the cleavage process with use of trypsin or Lys-C executed in the past.

(Item 9) The analysis device for data obtained in mass spectrometry according to another aspect, wherein the mass spectrometry is tandem mass spectrometry or liquid chromatography/tandem mass spectrometry, in the analysis device for data obtained in mass spectrometry according to any one of items 1 to 8. Thus, the allergen-derived peptide can be detected accurately by separation that is performed in two or more stages.

(Item 10) A mass spectrometry device according to one aspect includes the analysis device for data obtained in mass spectrometry according to any one of items 1 to 9. Thus, the allergen-derived peptide can be detected, and the allergen included in the sample can be derived accurately.

(Item 11) A mass spectrometry method according to one aspect includes acquiring detection information representing a peptide that is detected when a sample is subjected to a cleavage process and then subjected to mass spectrometry, and producing allergen information in regard to an allergen included in the sample based on the detection information and data (reference data) representing a peptide that is produced when each allergen is subjected to the cleavage process, wherein the allergen information is produced based on a combination of a plurality of peptides in a case in which the plurality of peptides produced from one allergen in the data are detected. Thus, the allergen included in the sample can be derived accurately from the detected allergen-derived peptide.

(Item 12) A non-transitory computer readable medium storing an analysis program according to one aspect for causing a computer to execute an information acquiring process (corresponding to the step S1003 of the flowchart of FIG. 4) of acquiring detection information representing a peptide that is detected when a sample is subjected to a cleavage process and then subjected to mass spectrometry, and an information producing process (corresponding to the step S1005) of producing allergen information in regard to an allergen included in the sample based on the detection information and data (reference data) representing a peptide that is produced when each allergen is subjected to the cleavage process, wherein in the information producing process, the allergen information is produced based on a combination of a plurality of peptides in a case in which the plurality of peptides produced from one allergen in the data are detected. Thus, the allergen included in the sample can be derived accurately from the detected allergen-derived peptide.

The present invention is not limited to the contents of the above-mentioned embodiment. Other aspects considered in the scope of technical idea of the present invention are also included in the scope of the present invention.

The invention claimed is:

1. An analysis device for data obtained in mass spectrometry, comprising:
   an information acquirer that acquires detection information representing a peptide that is detected when a sample is subjected to a cleavage process and then subjected to mass spectrometry; and
   an information producer that produces allergen information in regard to an allergen included in the sample based on the detection information and data representing a peptide that is produced when each allergen is subjected to the cleavage process, wherein
   the information producer produces the allergen information based on a combination of a plurality of peptides in a case in which the plurality of peptides produced from one allergen in the data are detected.

2. The analysis device for data obtained in mass spectrometry according to claim 1, wherein
   the data includes a value associated with a peptide and an allergen, and
   the information producer produces the allergen information based on a plurality of the values in regard to the plurality of peptides and the one allergen in a case in which the plurality of peptides produced from the one allergen in the data are detected.

3. The analysis device for data obtained in mass spectrometry according to claim 2, wherein
   the value is set based on a count of allergens derived from a peptide in the data.

4. The analysis device for data obtained in mass spectrometry according to claim 2, wherein
   the value is a numerical value, and
   the information producer produces the allergen information based on whether a calculated value that is calculated based on a plurality of the values satisfy a condition based on a threshold value in a case in which the plurality of peptides produced from the one allergen in the data are detected.

5. The analysis device for data obtained in mass spectrometry according to claim 4, wherein
   the calculated value is a sum or a weighted sum of a plurality of the numerical values.

6. The analysis device for data obtained in mass spectrometry according to claim 5, wherein
   the calculated value is the weighted sum, and
   a weight of the weighted sum is a detection intensity of the plurality of peptides respectively corresponding to the plurality of numerical values.

7. The analysis device for data obtained in mass spectrometry according to claim 1, wherein
   an allergen included in the data is at least one allergen selected from milk, chicken eggs, wheat, barley, rye, oats, mustard, sesame seeds, macadamia nuts, pistachio nuts, brazil nuts, walnuts, peanuts, hazelnuts, buckwheat, shrimp, crab, ovalbumin, lysozyme, casein, lactoglobulin, a high molecular weight glutenin and a low molecular weight glutenin.

8. The analysis device for data obtained in mass spectrometry according to claim 1, wherein
   the data represents a peptide that is produced when each allergen is subjected to a cleavage process with use of at least one of trypsin and Lys-C.

9. The analysis device for data obtained in mass spectrometry according to claim 1, wherein
   the mass spectrometry is tandem mass spectrometry or liquid chromatography/tandem mass spectrometry.

10. A mass spectrometry device including the analysis device for data obtained in mass spectrometry according to claim 1.

11. An analysis method for data obtained in mass spectrometry, including:
    acquiring detection information representing a peptide that is detected when a sample is subjected to a cleavage process and then subjected to mass spectrometry; and
    producing allergen information in regard to an allergen included in the sample based on the detection information and data representing a peptide that is produced when each allergen is subjected to the cleavage process, wherein
    the allergen information is produced based on a combination of a plurality of peptides in a case in which the plurality of peptides produced from one allergen in the data are detected.

12. A non-transitory computer readable medium storing an analysis program for causing a computer to execute:
    an information acquiring process of acquiring detection information representing a peptide that is detected when a sample is subjected to a cleavage process and then subjected to mass spectrometry; and
    an information producing process of producing allergen information in regard to an allergen included in the sample based on the detection information and data representing a peptide that is produced when each allergen is subjected to the cleavage process, wherein
    in the information producing process, the allergen information is produced based on a combination of a plurality of peptides in a case in which the plurality of peptides produced from one allergen in the data are detected.

* * * * *